United States Patent [19]
Payne

[11] Patent Number: 5,420,779
[45] Date of Patent: May 30, 1995

[54] INVERTER CURRENT LOAD DETECTION AND DISABLE CIRCUIT

[75] Inventor: Rodger E. Payne, Lampasas, Tex.
[73] Assignee: Dell USA, L.P., Austin, Tex.
[21] Appl. No.: 26,383
[22] Filed: Mar. 4, 1993
[51] Int. Cl.[6] .......................................... H02M 7/122
[52] U.S. Cl. ...................... 363/56; 315/225; 361/91; 361/101
[58] Field of Search ...................... 363/55, 56; 361/91, 361/101; 315/225

[56] References Cited

U.S. PATENT DOCUMENTS

| | | | |
|---|---|---|---|
| 3,889,153 | 6/1975 | Pierce | 315/209 R |
| 4,330,736 | 5/1982 | Perper | 315/209 R |
| 4,461,980 | 7/1984 | Nilssen | 315/225 |
| 4,616,158 | 10/1986 | Krummel et al. | 315/225 |
| 4,716,343 | 12/1987 | Lindqvist | 315/307 |
| 4,739,462 | 4/1988 | Farnsworth et al. | 363/21 |
| 4,952,848 | 8/1990 | Erhardt | 315/307 |
| 5,063,490 | 11/1991 | Maehara et al. | 363/37 |
| 5,111,114 | 5/1992 | Wang | 315/225 |
| 5,142,202 | 8/1992 | Sun et al. | 315/225 |
| 5,170,099 | 12/1992 | Ueoka et al. | 315/291 |

FOREIGN PATENT DOCUMENTS 1383673 2/1975 United Kingdom .................. 363/56

*Primary Examiner*—Jeffrey L. Sterrett
*Attorney, Agent, or Firm*—James Hoffman; David Hitt; Jeff Hood

[57] ABSTRACT

A circuit and method for protecting a voltage inverter circuit is disclosed. The circuit comprises a first comparison circuit capable of comparing a first reference voltage to a voltage indicative of the load current of the voltage inverter. When the comparison circuit signals that the first reference voltage is greater than the load voltage, a disable circuit coupled to the first comparison circuit disables the voltage inverter. In the preferred embodiment, the inverter provides power to a cold cathode fluorescent lamp which, if damaged, can harm the inverter.

23 Claims, 9 Drawing Sheets

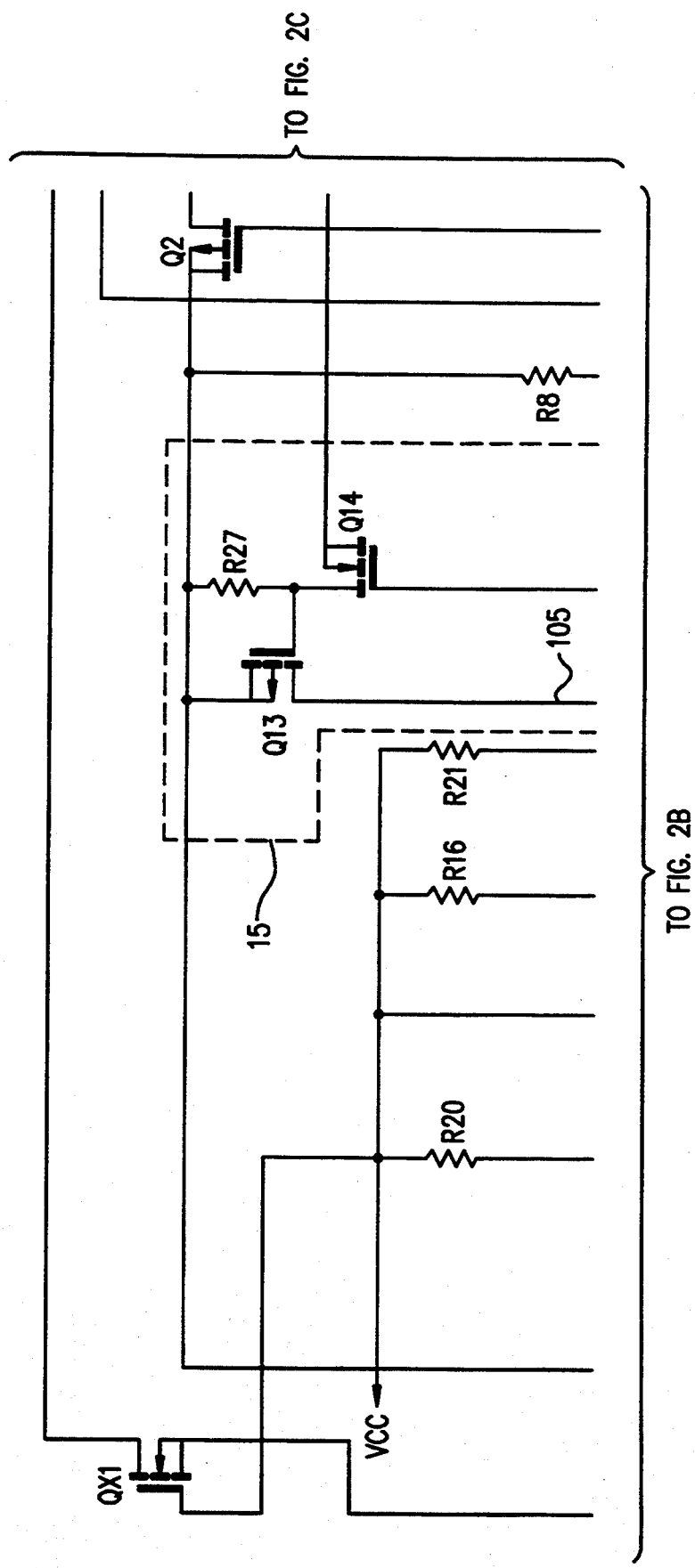

INVERTER CURRENT LOAD DETECTION AND DISABLE CIRCUIT

TECHNICAL FIELD OF THE INVENTION

This invention relates in general to protection circuits and, more particularly, to a circuit for protecting an inverter circuit, used to convert a DC voltage to an AC voltage, when an insufficient load is present at an output of the inverter circuit.

BACKGROUND OF THE INVENTION

Recent advancements in computer technology have evolved the conventional desktop personal computer into portable versions. Essentially, the only limiting factor in the progressing miniaturization of the computer is the physical characteristics of the human body. A user still requires a keyboard to enter data into the computer and a display screen to observe computer data. Keyboards must be at least a minimum size for the human hand to effectively operate the keys, and the human eye is strained to observe images below a minimum size. Thus, the latest models of the portable or lap-top computers still require an adequate display so that a user may effectively use the computer.

Desktop computers generally take advantage of the full capabilities of cathode ray tube ("CRT") displays. Their bulky size is not restrictive since the desk-top computer is not required to be mobile. However, bulky CRT displays are not at all practical for portable or lap-top computers. As a consequence, flat panel displays have been developed for portable computers so that they may remain small and lightweight. Such flat panel displays are most typically of the liquid crystal display ("LCD") type. The disadvantage of such displays is that they are difficult to view in bright rooms or sunlight since they do not generate their own light as do CRT displays. The solution to this problem is found in so called "backlit" displays whereby an external light source is utilized to illuminate the flat panel display. Such light sources may be, for example, cold cathode fluorescent lamps disposed on the sides of the display screen. The lamps are generally powered by a voltage supply and allow a user to adjust either or both the contrast and brightness of the display.

Since one of the advantages of a portable computer is its mobility, it needs to be able to operate on a DC power supply such as a rechargeable battery located within the computer chassis. Consequently, the backlit lamps must also receive their power from the DC source. However, such lamps generally require an AC power source which is not available when the computer is powered by its internal DC battery. Therefore, an inverter circuit is required to transform the power source from DC to AC for utilization by the lamp.

The addition of the fluorescent lamp and its associated inverter circuit introduces the possibility of yet an additional problem. By the very nature of a portable computer, its contents must be able to withstand greater physical stress resulting from the repeated transportation of the computer. This is not as great a concern with respect to inverter circuits as it is to fluorescent lamps, as they tend to be more susceptible to damage.

An additional concern is the proper installation and connection of the fluorescent lamp during manufacture. Even with tight quality controls, a computer may occasionally depart the manufacturing facility with an improperly connected fluorescent lamp.

A simple solution to the aforementioned problems is to either replace the lamp if it is damaged or properly connect it to the inverter circuit if that remains to be done. Such solutions, though bothersome to the owner of the computer, are relatively simple and inexpensive. The greater concern is the possibility of damage to the components of the inverter circuit if the fluorescent lamp is not properly connected to the circuit or if the lamp breaks during operation. Upon such occurrences, an open circuit results between the connections of the fluorescent lamp at the output of the inverter resulting in its high voltage transformer and driver components (field effect transistors and diodes) becoming overly stressed and eventually failing. It is possible to design a transformer that can withstand a surge in voltage and not burn up, but such a transformer is substantially more expensive and physically larger and heavier.

A not uncommon occurrence is for the lamp to break due to a mishandling of the computer. Thereafter, when the user turns on the computer, it goes through its normal power up routines and attempts to turn on the lamp through the inverter circuit. Because the output of the circuit is not "closed" by the presence of a working lamp, the voltage in the transformer increases up to about 5,000 to 15,000 volts attempting to illuminate a faulty load. Often, other components within the inverter circuit will fail. Unfortunately for the user, a transformer or complete inverter circuit is much more difficult and expensive to replace than a fluorescent lamp.

Therefore, what is needed is an inverter protection circuit for protecting the transformer and the remainder of the inverter circuit upon the occurrence of a fault, such as when the fluorescent lamp is improperly connected to the inverter circuit or when it has been broken during use as described above. Such a protection circuit would also be useful and applicable to any piece of equipment where high voltage AC is derived from a DC source, such as in calculators, liquid crystal television displays and electroluminescent displays.

There have been several attempts in the past for providing such a protection circuit. FIG. 4 shows one prior art circuit for protecting a cold cathode fluorescent lamp. However, no provision has been made within this circuit for when the lamp is either broken or not properly connected resulting in an open circuit at the location of the lamp. Thus, this circuit cannot protect against all possible lamp faults.

FIG. 5 shows another prior art protection circuit wherein a thermal fuse is the means of protection. This fuse is in thermal contact with the high voltage transformer. When the transformer heats up because of increasing voltage, the thermal fuse will eventually blow, shutting down the entire circuit. However, during the interval before the fuse blows, the transformer and other important components of the inverter circuit are still voltage—stressed. Thus, this circuit does not have sufficient response time to ensure minimal inverter circuit stress.

FIG. 6 shows yet another prior art protection circuit that does provide for protection of the circuit in the instance where there is "no lamp." When the lamp circuit is open, the voltage at transistor Q9's collector is higher than diode D3's breakdown voltage, resulting in current flowing into a node of resistor R24, capacitors C12 and C2 and resistor R22. This causes inverter output to be reduced to safe limits, but still does not result in a total shutdown of the inverter circuit, which is the best means of protecting the transformer and its associated components.

What is needed is an effective protection circuit for an inverter circuit supplying power to a fluorescent lamp. In a preferred embodiment, the fluorescent lamp is a cold cathode fluorescent lamp ("CCFL"). The protection circuit should quickly turn off the power to the inverter circuit and its transformer upon the occurrence of a disconnected or broken CCFL, or when the CCFL fails to light for some other circuit malfunction, so that the high voltage transformer and driver components are not overly stressed and fail.

SUMMARY OF THE INVENTION

The present invention is directed to a system for protecting an inverter circuit which converts a DC voltage source to an AC voltage source to illuminate a cold cathode fluorescent lamp ("CCFL"), commonly used to illuminate displays in computer devices such as portable computers. The protection circuit disables the inverter circuit by removing the DC voltage source from the inverter upon the detection of an open circuit at the location where the CCFL resides. Such an open circuit could occur upon a breakage of the CCFL or upon an unsatisfactory connection between the inverter circuit and the CCFL. The removal of the DC voltage source prevents a surge in voltage within the transformer of the inverter circuit and relieves any stress that may be induced upon the transformer and its associated driver components.

The detection circuit senses the voltage present at the load of the inverter circuit. If the CCFL fails, resulting in an open circuit at the load, no voltage will be sensed. Upon detection of no voltage, a signal is sent to disable the inverter circuit.

More specifically, a feedback loop senses, on a continuous basis, a voltage produced by current flowing through the CCFL. The sensed load voltage is compared to a reference voltage supplied within the inverter circuit. During normal operation, the sensed voltage will be greater than the reference voltage and no signal will be sent to disable the inverter circuit. However, upon the sensing of no or low voltage by the feedback loop, the reference voltage will be greater than the sensed voltage, resulting in a signal being sent to disable the inverter circuit.

In one embodiment of the present invention, the protection circuit comprises the addition of two field effect transistors ("FET"s) and two resistors to the inverter. A feedback loop is connected to the load of the inverter circuit to sense whether or not a voltage is present. This sensed voltage is compared by one of the FET's to a reference voltage found within the inverter circuit. During normal operation, the CCFL will have current passing through it, resulting in a voltage present at the load. The feedback loop sensing the load voltage is connected to a source of the first FET, and the reference voltage is connected to a gate of the first FET. As long as the sensed load voltage is greater than the reference voltage, the first FET is not enabled.

However, upon the occurrence of no or little sensed voltage, because of an open circuit at the load of the inverter circuit, the first FET will be enabled because the reference voltage will now be greater than the sensed load voltage. A voltage will now appear at a drain of the first FET, which is connected to a gate of the second FET in the protection circuit. The second FET is biased in an off, or disabled, condition during normal operation of the inverter circuit. However, upon the presence of a voltage from the drain of the first FET appearing at the gate of the second FET, current will conduct from a source to a drain of the second FET. The source of the second FET is connected to a second reference voltage within the inverter circuit. When the second FET is turned on, the drain of the second FET is pulled up to the voltage of the source. The drain of the second FET is connected to one input to a comparator circuit. The other input to the comparator circuit is connected to a third reference voltage within the inverter circuit. During normal operation, the two FETs are not enabled and therefore, the second input to the comparator circuit is greater than the first input resulting in no signal being sent from the comparator circuit. However, when the second FET is turned on, and its drain is provided a voltage signal, it sends a voltage to the first input to the comparator circuit that is now greater than the voltage at the second input of the comparator circuit. As a result, a signal is sent from the comparator circuit to a set of transistors within the inverter circuit resulting in a removal of the DC voltage source from the inverter circuit. The inverter circuit will remain off until either its power is recycled or the enable switch in the inverter circuit is again turned on.

The protection circuit may be implemented by using various combinations of bipolar transistors and integrated circuit comparators. Though they are within the scope of the present invention, all other known alternative means for implementing the inverter circuit require more components and more area.

The protection circuit of the present invention is cost-effective because it adds only four low cost components to the existing inverter circuit. In addition, the protection circuit permits the inverter circuit to be self latching and auto-resetting. The protection circuit also protects against further discharge of the battery within the portable computer and prevents overheating of other components.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
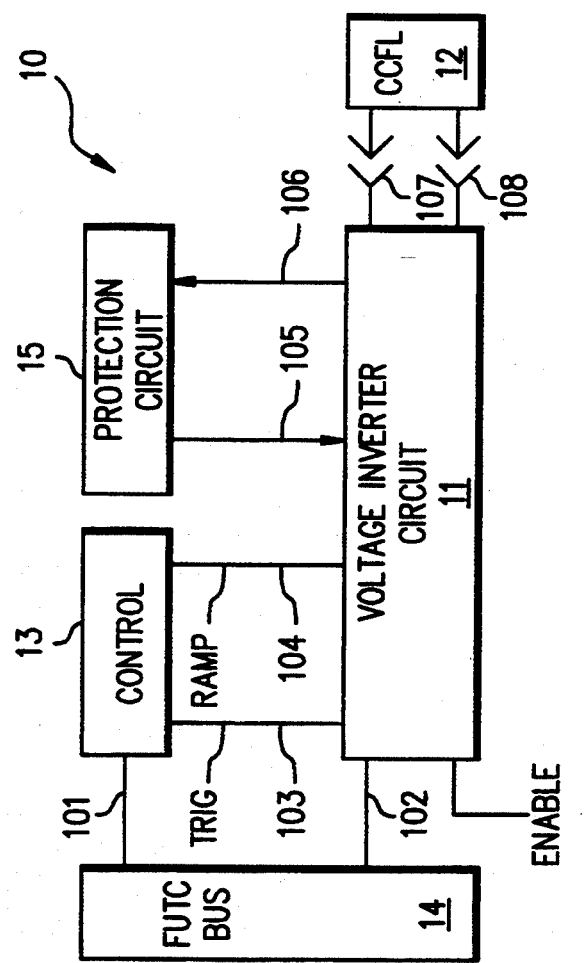
FIG. 1 illustrates a functional diagram of the implementation of the protection circuit with a voltage inverter circuit powering a cold cathode fluorescent lamp ("CCFL")

Referring to FIG. 1, there is illustrated a diagram of circuitry 10 embodying the present invention. Circuitry 10 is comprised of voltage inverter 11 which obtains its power through connection 102 from a DC voltage source via FUTC bus 14. Voltage inverter 11 transforms the DC voltage obtained from bus 14 into an AC voltage for illuminating cold cathode fluorescent lamp ("CCFL") 12 via connections 107 and 108. The brightness of the associated flat panel display (not shown) illuminated by CCFL 12 is controlled by brightness control 13 which is also powered by bus 14 via connection 101. Contrast control 13 receives signals from inverter 11 via connections 103 and 104 for its operation. Voltage inverter 11 is activated by an enable signal transmitted via connection 16. The enable signal originates within the portable computer (not shown), and is generally activated when the computer is turned on.

Protection circuit 15 monitors a load voltage in voltage inverter 11 via feedback loop 106. This monitored load voltage is referenced to the current passing through CCFL 12 between connections 107 and 108. Upon the sensing of no voltage at the load, protection circuit 15 sends a signal via 105 to disable voltage inverter 11. The no voltage condition will commonly occur upon a breakage of CCFL 12 or if there is no connection made at 107 or 108. Either of these two conditions would result in no current passing from connection 107 to 108.

Figure 2B:
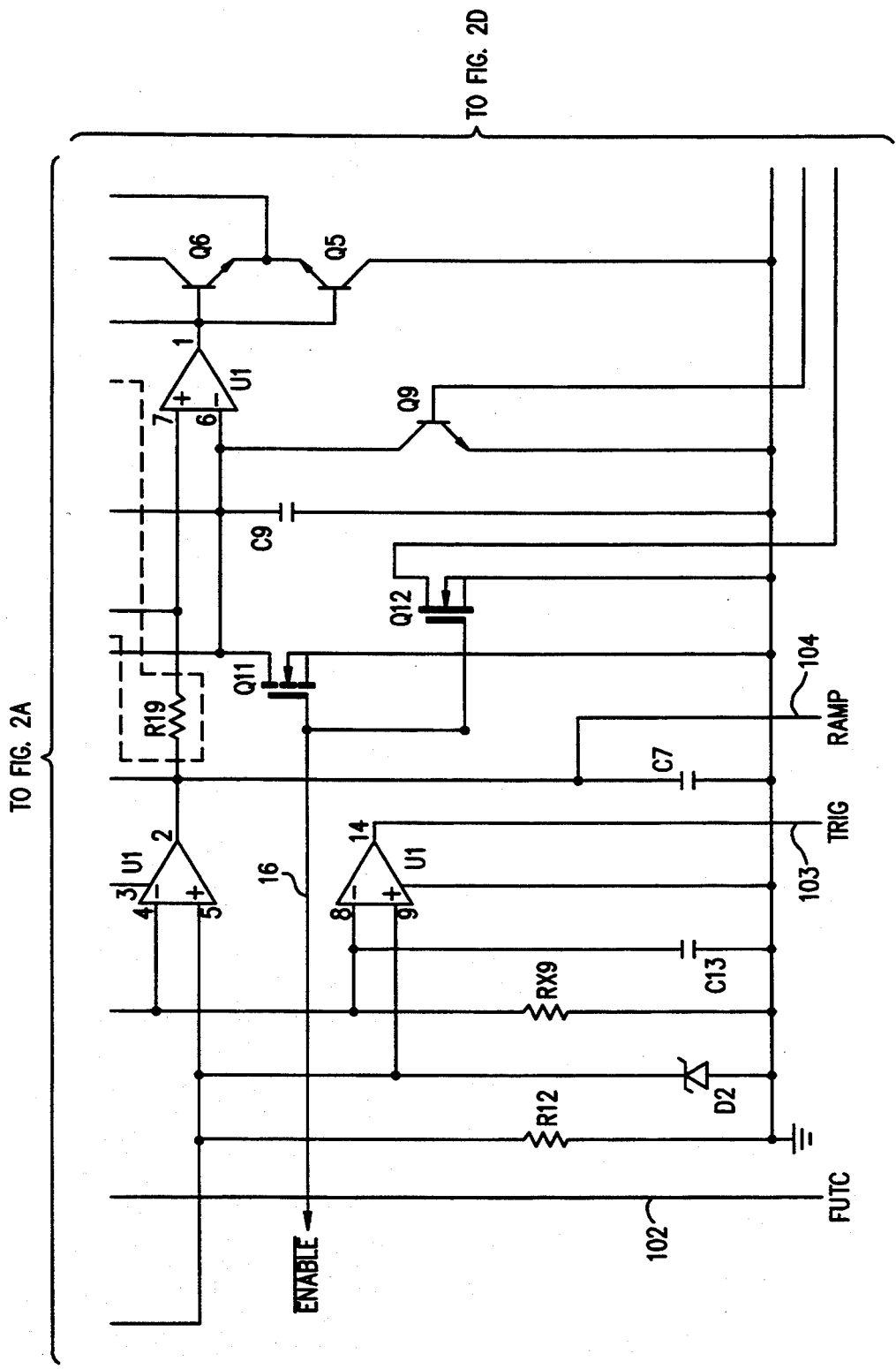
FIG. 2 illustrates a specific embodiment of the present invention within an inverter circuit.
Figure 2C:
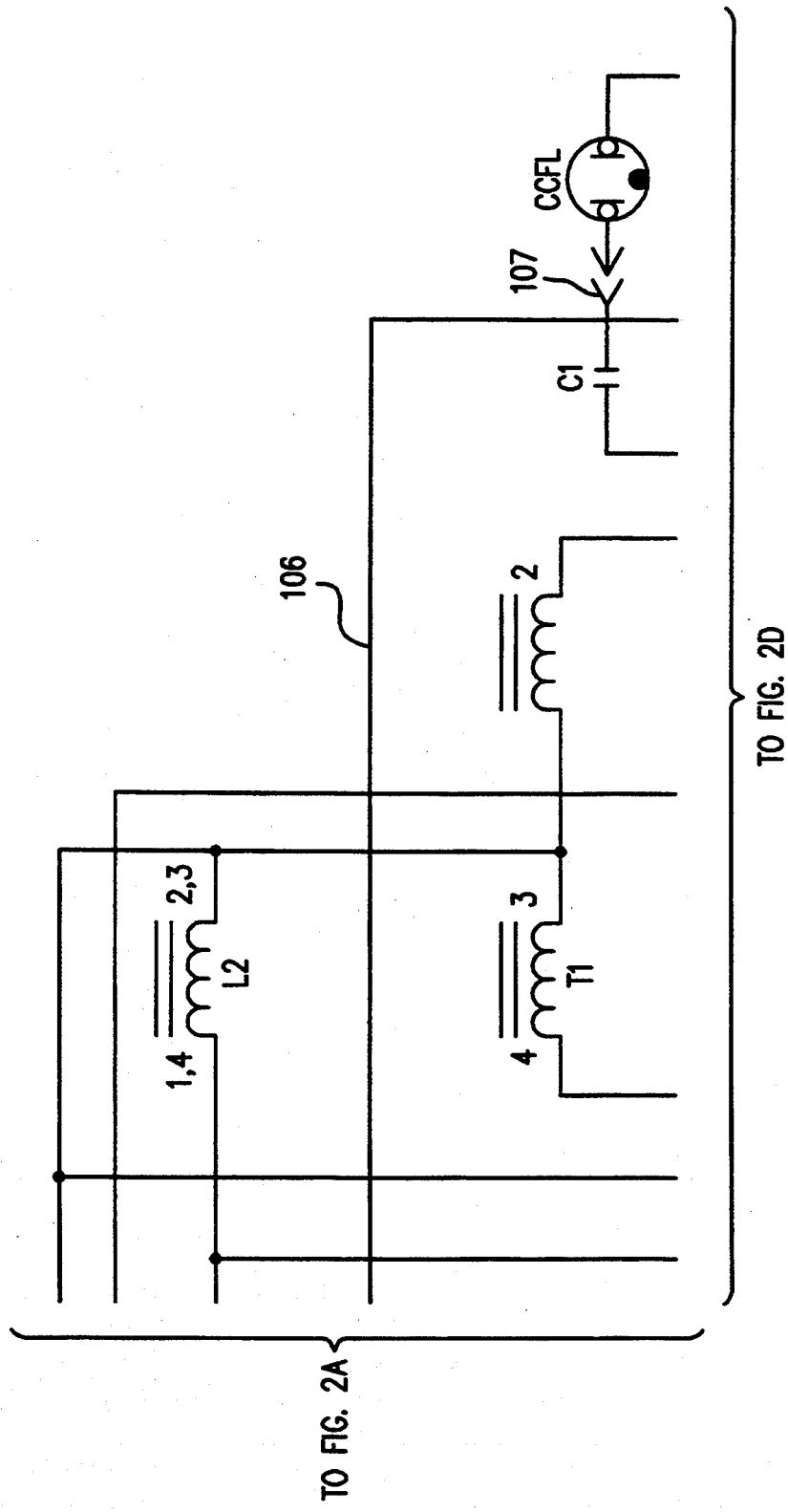
Figure 2D:
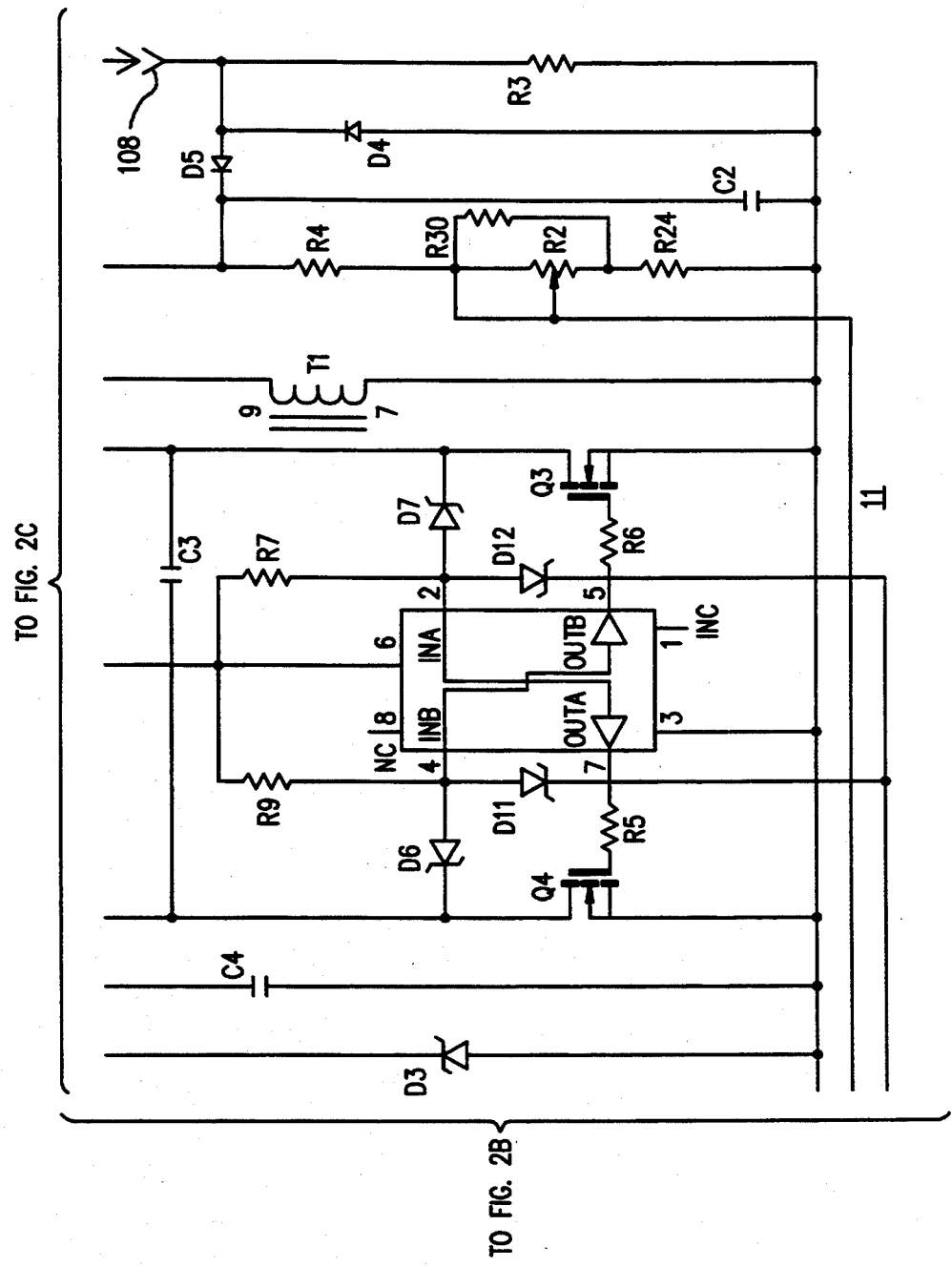

Referring next to FIG. 2, there is shown a specific embodiment of the present invention. Voltage inverter circuit 11 is shown connected to FUTC bus 14 via connection 102. CCFL 12 is shown connected to inverter circuit 11 via connections 107 and 108. And, the components utilized in protection circuit 15 are shown with feedback loop 106, and with connection 105 for transmitting the signal to disable inverter 11. Protection circuit 15 represents components that have been added to inverter 11 to enable the present invention. FUTC bus 14 is the main power bus for inverter 11. Bus 14 may be fused for surge protection.

As previously described, the enable signal transmitted via connection 16 activates inverter 11. During power up or whenever an external monitor is being used by the associated computer (not shown), this signal is active and high, and is applied to the gates of field effect transistors ("FET"s) Q11 and Q12 turning them on and effectively shorting out inverter 11.

However, if the enable signal is made active and low, FETs Q11 and Q12 turn off and capacitor C9 begins charging toward the voltage supplied by Vcc, which is preferably +5 volts. This charging ramps up (gradually increases) the reference voltage for comparator U1 and slowly activates a buck regulator circuit, which comprises Flit Q2, diode D3, inductor L2 and capacitor C4. This gradual activation of the buck regulator prevents an in-rush of a large current from being generated and applied to inverter 11.

The heart of the buck regulator is power switch Flit Q2 which switches the DC voltage supplied by bus 14 on and off through diode D3, inductor L2 and capacitor C4. The on and off time (duty cycle) is controlled by a pulse width modulation ("PWM") circuit, discussed later. When power switch FET Q2 is on, it supplies current to inductor L2, which clips the waveform and is used as the clock input to pin 5 of comparator U1, which generates the ramp signal sent via connection 104 to brightness control 13 and to pin 9 of comparator U1 which generates the trig signal sent via connection 103 and used for a Vee converter within brightness control circuit 13. FET QX1 clips off the top half of the feedback signal so that only the fast rising edge is used to provide the clock signal. This provides much faster response time of the pulse width modulation signal PWM and enables larger controllable duty cycles for the buck circuit and Vee converter. The clock signal present at pin 5 of comparator U1 is compared to the reference voltage at pin 4 to generate the ramp signal from pin 2. This circuit, called a "zero detect" circuit allows for efficient switching in the FETs when their voltages are at zero, reducing much of the stress associated with switching supplies. The voltage reference is generated from the voltage divider circuit of resistor R20 and resistor RX09.

The ramp signal is then fed to pin 7 of comparator U1 and compared to the signal produced at pin 6. This signal is the feedback signal that is used to control the duty cycle of FET Q2. This signal is shorted to ground if the enable signal is not active. The output signal at pin 1 of comparator U1 is fed to switching transistors Q5 and Q6 which provide drive current to switch FET Q2.

The CCFL 12 output voltage is rectified by diode D5 and sent to a voltage divider network of resistors R4, R2 and R24. Resistor R30 is used as a trim resistor for resistor R2. A signal provided by this network is fed back and applied to the base of transistor Q9, which is used to control the voltage on pin 6 of comparator U1. This allows the "on" time of FET Q2 to be adjusted thereby providing an adjustment of the brightness of CCFL 12. An external potentiometer may be coupled to inverter 11 to permit user adjustment of the brightness of CCFL 12.

A Royer oscillator is used within inverter 11 as a self-resonant circuit whose frequency is determined by the inductance of the primary of transformer T1 and capacitor C4 and the load. As inverter 11 is powered up, only one of the power FETs (Q4 and Q3) can be activated, and current begins to flow through the site of the primary of transformer T1 associated with the power FET (Q3 or Q4) that is powered on. There is feedback of the signal through each power FET (Q3 and Q4) through U3 to the gate of the FET that is on. This controls the on time of FETs Q4 and Q3. As either FET Q4 or Q3 turns off the other FET drives current through its side of the primary of transformer T1, and a portion of this current is fed back into that FET's gate through U3.

Diodes D6 and D7 provide DC isolation of the voltage supplied by FUTC bus 14 and steer the feedback voltage from transformer T1 to the gates of FETs Q3 and Q4. Diodes D11 and D12 are connected to inputs of U3 (pins 4 and 2) and will be pulled low whenever the enable signal is not active. This pulls both the gates of FETs Q3 and Q4 to ground preventing the oscillator from running whenever the enable signal is not active. As outlined in FIG. 2 and as previously mentioned, protection circuit 15 consists of the addition of FET Q13, FET Q14, and resistors R27 and R19 to inverter 11.

If protection circuit 15 is not present and CCFL 12 fails resulting in no current flowing between connections 107 and 108, then no voltage will be present across capacitor C2. This results in no voltage being presented to the base of transistor Q9 which in turn cannot turn on and regulate the voltage being applied to pin 6 of comparator U1 across the faster capacitor C9. The voltage that passes through resistor R21 will rise according to a specific preselected time constant. This pulls up the voltage presented at pin 6 of comparator U1 almost equal to the voltage applied to pin 7 of comparator U1. Now since pin 7 and pin 6 are at relatively the same voltage, the signal emanating from pin 1 of comparator U1 becomes very erratic. This signal is applied to the bases of transistors Q5 and Q6 which is a buffer stage that drives FET Q2. FET Q2 is a channel for feeding voltage from FUTC 14 into inductor L2 which in turn supplies voltage to transformer T1. When FET Q2 remains continuously activated because of the erratic signal emanating from pin 1 of comparator U1, the circuit begins to oscillate by itself. The continuous current being channeled through FET Q2 will eventually saturate inductor L2. FETs Q3 and Q4 will receive excessive current resulting in an extremely high voltage in the secondary of transformer T1 eventually burning up transformer T1.

Protection circuit 15 is implemented to prevent this from occurring. As previously stated, protection circuit 15 is comprised of FET Q 13, FET Q14, resistor K19 and resistor R27 connected within inverter 11. The source of FET Q14 is connected to the junction of diode D5, resistor R4 and capacitor C2. When CCFL 12 is plugged in and working (no fault), there is a positive voltage at this junction. That positive voltage is greater than the voltage that is present at capacitor C9 which is also a positive voltage referenced to Vcc. That causes the n channel FET Q14 to have a voltage supplied to its source that is higher than the voltage supplied to its gate, resulting in FET Q14 being turned off. The gate of FET Q13 is connected to the drain of FET Q14. When FET Q14 is turned off, the gate of FET Q13 is pulled high to its source via resistor R27, resulting in FET Q13 being turned off. The result of FET Q13 being turned off is that protection circuit 15 does not send a signal via connection 105 to disable inverter 11, since it has detected the presence of an adequately connected and operable CCFL 12. Q14 operates as a first comparing component. Comparator U1 operates as a second comparing component. Q13 and Q14 act in conjunction with U1 to disable inverter 11 and thus constitute a disabling circuit.

When CCFL 12 is either broken or not present, resulting in no current flowing between connections 107 and 108, a voltage is then not present at the junction of diode D5, resistor R4 and capacitor C2. As a result, protection circuit 15 senses this lack of voltage via feedback loop 106. Since no voltage is present to the source of FET Q14, it is turned on since it does have a greater positive voltage supplied to its gate by capacitor C9 than is present at FET Q 14's source. When FET Q 14 is eventually turned on, it pulls the gate of FET Q13 to the zero voltage that has been sensed by connection 106 and supplied to the source of FET Q14. FET Q13 is a p channel FET; thus, FET Q13's drain is pulled up to its source. The drain of FET Q13 is connected to pin 7 of comparator U1 and that pulls pin 7 to the voltage supplied by bus 14.

Resister R19 is supplied within protection circuit 15 in order to allow pin 7 of comparator U1 to go to a high voltage even though that point is generally low because it is connected to pin 2 of comparator U1.

The result is that pin 7 of comparator U1 is pulled to a higher voltage than the voltage supplied to pin 6 resulting in comparator U1 producing a signal at pin 1. This signal is supplied to the base of transistor Q6 which turns on transistor Q6 and pulls the voltage of its emitter up to the voltage of bus 14, which is the voltage supplied to the source of FET Q2. Since the gate and source of FET Q2 are the same, FET Q2 turns off resulting in no voltage available to inductor L2, which in turn results in no voltage being supplied to transformer T1. The threshold voltage of FET Q14 provides immunity to false turn on of the detection circuit during the power on cycle.

In order to prevent protection circuit 15 from sending a signal over connection 105 to inverter 11 when inverter 11 is initially powered up by an enable signal at connection 16, the time constants of capacitor C9 and capacitor C2 are formulated to allow for the voltage to rise on capacitor C2 faster than the voltage on capacitor C9. Thus, the voltage detected by connection 106 of protection circuit 15 will be greater than the voltage supplied by capacitor C9 to the gate of FET Q14 which in turn prevents protection circuit 15 from operating as previously described.

Figure 3:
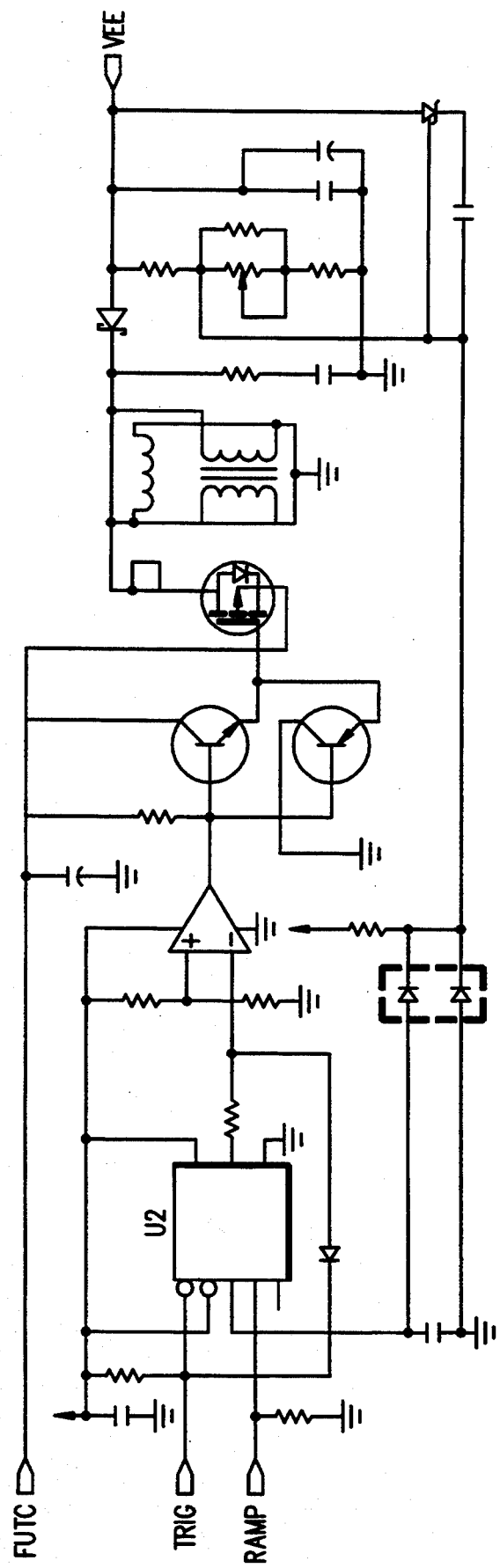
FIG. 3 illustrates a brightness control circuit that typically accompanies an inverter circuit.

The trig and ramp signals produced by inverter 11 are sent via connections 103 and 104 respectively to control circuit 13 which utilizes these signals to produce brightness and, Vee for use by the display of the lap-top computer. An illustration of a typical brightness control circuit 13 is shown in FIG. 3.

If no voltage is supplied from inductor L2 due to activation of protection circuit 15, no trig signal from U1 on connection 103 will pass to control circuit 13, which, as a result, will not produce the brightness or Vee signal, thus disabling the computer's display (not shown).

Figure 4:
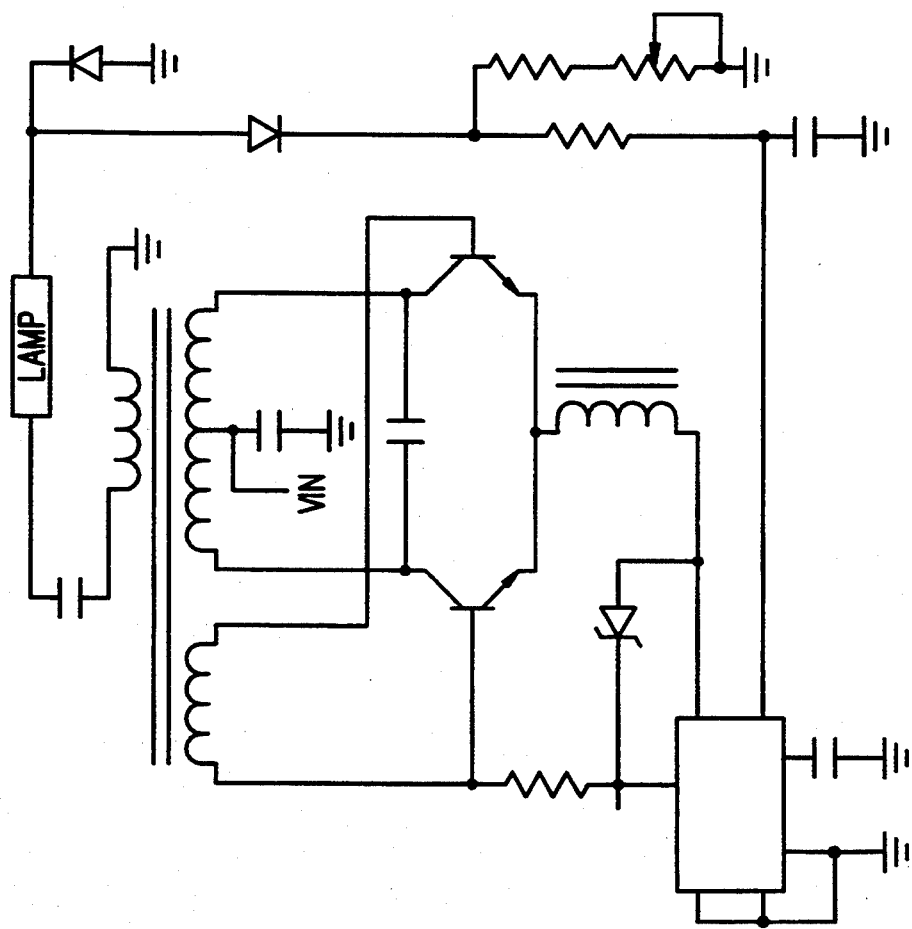
FIGS. 4-6 illustrate prior art protection circuits.
Figure 5:
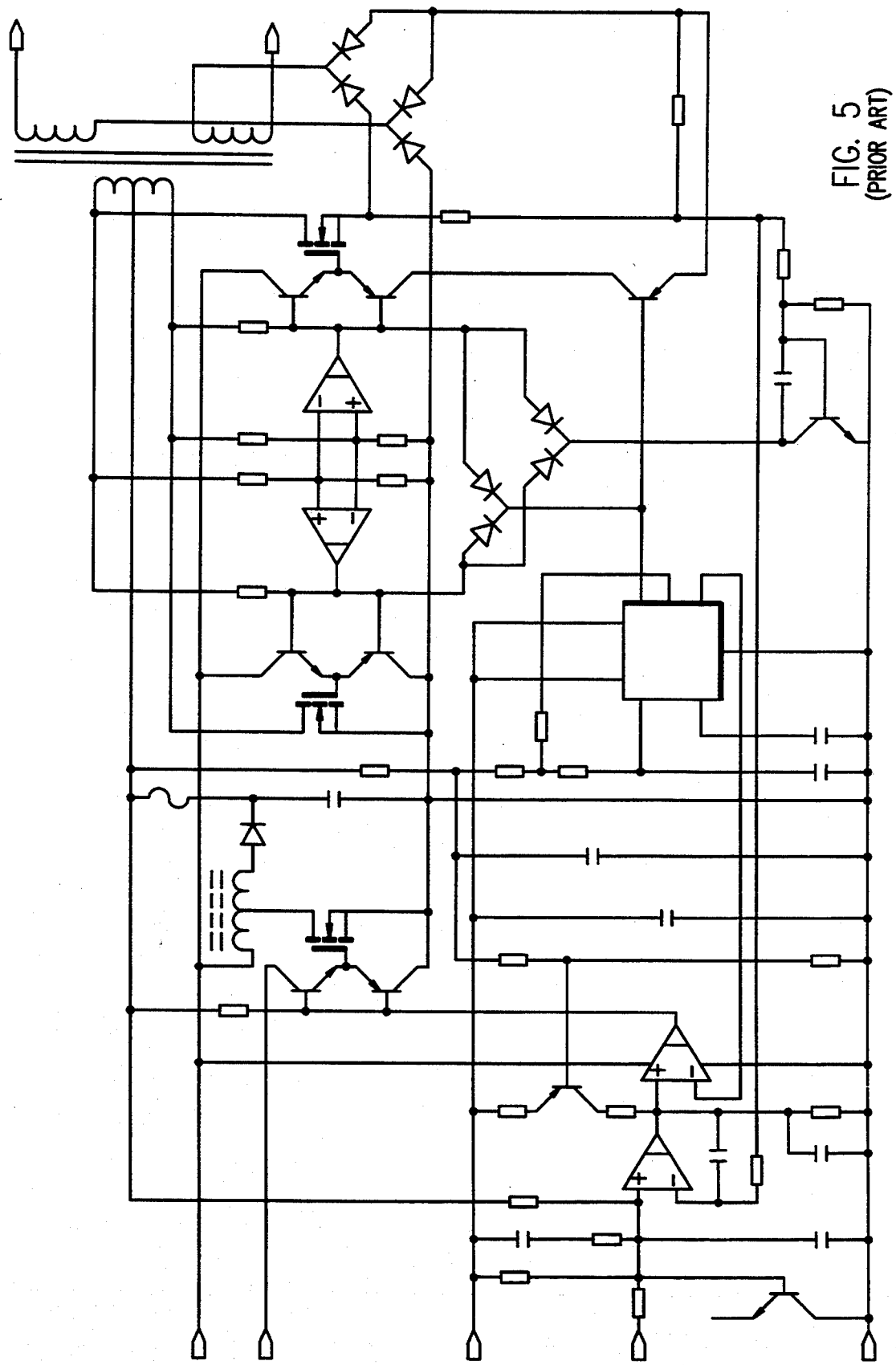
Figure 6:
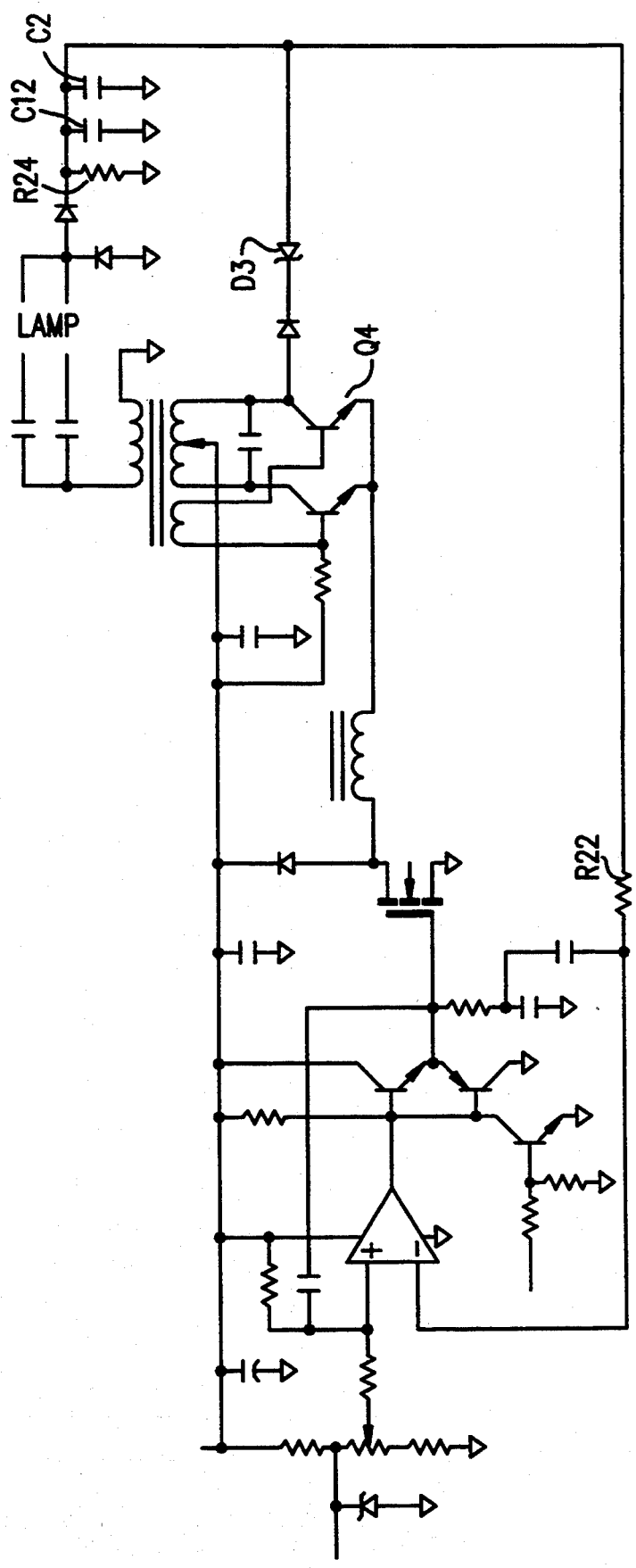

FIGS. 4–6 illustrate three prior art protection circuits which have been described in the Background of the Invention section of this specification.

Although the present invention and its advantages have been described in detail, it should be understood that various changes, substitutions and alterations can be made herein without departing from the spirit and scope of the invention as defined by the appended claims.

What is claimed is:

1. A circuit for protecting a voltage inverter, comprising:
   a circuit for sensing a load current of said voltage inverter and for providing a voltage indicative thereof:
   a first comparison circuit capable of comparing a first reference voltage to said voltage indicative of said load current of said voltage inverter; and
   a disable circuit capable of disabling said voltage inverter when said first comparison circuit signals that said first reference voltage is greater than said voltage indicative of said load current, said disable circuit comprising a second comparison circuit capable of comparing a second reference voltage to a third reference voltage, said second reference voltage applied to said second comparison circuit when said first comparison circuit signals that said first reference voltage is greater than said voltage indicative of said load current, said disable circuit operative in response to said second reference voltage being greater than said third reference voltage.

2. The circuit as recited in claim 1 wherein said first comparison circuit is an n channel FET having a source of said n channel FET coupled to said voltage indicative of said load current and a gate of said n channel FET coupled to said first reference voltage, wherein said n channel FET is turned on when said first reference voltage is greater than said voltage indicative of said load current, resulting in said voltage indicative of said load current being applied to a drain of said n channel FET.

3. The circuit as recited in claim 2 wherein said second comparison circuit is a comparator.

4. The circuit as recited in claim 1 wherein said disable circuit further comprises: a signal line, capable of providing a signal to said voltage inverter, directing said inverter to power down, said line operative in response to a resolution that said second reference voltage is greater than said third reference voltage.

5. The circuit as recited in claim 4 wherein said first reference voltage is equal to said third reference voltage.

6. The circuit as recited in claim 1 wherein said load current is applied to a cold cathode fluorescent lamp.

7. A circuit for protecting a voltage inverter, comprising:
 a circuit for sensing a load current of said voltage inverter and for providing a voltage indicative thereof;
 first means for comparing a first reference voltage to said voltage indicative of said load current of said voltage inverter; and
 means for disabling said voltage inverter, said disabling means operative in response to a resolution by said first comparing means that said first reference voltage is greater than said voltage indicative of said load current, said disabling means comprising:
  second means for comparing a second reference voltage to a third reference voltage; and
  means for applying said second reference voltage to said second comparing means, said applying means operative in response to said resolution by said first comparing means that said first reference voltage is greater than said voltage indicative of said load current, wherein said disabling means is operative in response to said second reference voltage being greater than said third reference voltage.

8. The circuit as recited in claim 7 wherein said first comparing means is an n channel FET having a source of said n channel FET coupled to said voltage indicative of said load current and a gate of said n channel FET coupled to said first reference voltage, wherein said n channel FET is turned on when said first reference voltage is greater than said voltage indicative of said load current resulting in said voltage indicative of said load current being applied to a drain of said n channel FET.

9. The circuit as recited in claim 8 wherein said applying means is a p channel FET having a gate of said p channel FET coupled to said drain of said n channel FET and having a source of said p channel FET coupled to said second reference voltage, wherein said second reference voltage is applied to a drain of said p channel FET when said second reference voltage is greater than said voltage indicative of said load current applied to said gate of said p channel FET.

10. The circuit as recited in claim 7 wherein said load current is applied to a cold cathode fluorescent lamp.

11. The circuit as recited in claim 10 wherein said disabling means further comprises:
 means for providing a signal to said voltage inverter directing said inverter to power down, said providing means operative in response to a resolution that said second reference voltage is greater than said third reference voltage.

12. The circuit as recited in claim 11 wherein said first reference voltage is equal to said third reference voltage.

13. A method for protecting a voltage inverter, said method comprising the steps of:
 sensing the load current of said voltage inverter and providing a voltage indicative of the sensed load current;
 comparing a reference voltage to the voltage indicative of the load current of said inverter circuit;
 sending a signal when said first reference voltage is greater than the voltage indicative of said load current;
 receiving said signal;
 applying a second reference voltage in response to said received signal;
 comparing said second reference voltage to a third reference voltage; and
 sending a disabling signal to said voltage inverter when said second reference voltage is greater than said third reference voltage.

14. The method as recited in claim 13 wherein said disabling signal directs said voltage inverter to power down.

15. The method as recited in claim 13 wherein said first reference voltage is equal to said third reference voltage.

16. A system for providing power to a lamp, comprising:
 an inverter having an input coupled to a direct current bus and an output for delivering an alternating current;
 means for producing a voltage, said produced voltage being a function of current passing through said inverter output;
 first means for comparing said produced voltage with a first reference voltage; and
 means for decoupling said inverter from said direct current bus when said reference voltage is greater than said produced voltage, wherein said decoupling means comprises:
  second means for comparing a second reference voltage to a third reference voltage; and
  means for applying said second reference voltage to said second comparing means, said applying means operative in response to said resolution by said first comparing means that said first reference voltage is greater than said produced voltage, wherein said decoupling means is operative in response to said second reference voltage being greater than said third reference voltage.

17. The system as recited in claim 16 wherein said fluorescent lamp is a cold cathode fluorescent lamp.

18. The system as recited in claim 16 wherein said lamp is a fluorescent lamp.

19. The system as recited in claim 16 wherein said inverter comprises a plurality of switches which pulse width modulate direct current delivered to said inverter via said direct current bus to produce said alternating current having a substantially sinusoidal waveform.

20. The system as recited in claim 16 wherein said direct current bus is coupled to a direct current power supply.

21. The system as recited in claim 20 wherein said direct current power supply is a battery.

22. The system as recited in claim 16 wherein said producing means comprises means for storing a voltage produced by a transformer coupled to said inverter output.

23. The system as recited in claim 16 wherein said comparing means is a FET having a source coupled to said producing means and a gate coupled to said reference voltage, wherein said FET is turned on when said reference voltage is greater than said produced voltage, resulting in said produced voltage being applied to a drain of said FET.

* * * * *